UNITED STATES PATENT OFFICE.

WILLIAM R. UHLEMANN, OF CHICAGO, ILLINOIS.

CEMENT FOR EYEGLASS-MOUNTINGS.

1,137,366.  Specification of Letters Patent.  Patented Apr. 27, 1915.

No Drawing.  Application filed May 1, 1914. Serial No. 835,731.

*To all whom it may concern:*

Be it known that I, WILLIAM R. UHLEMANN, a citizen of the United States of America, and a resident of Chicago, in the county of Cook, State of Illinois, have invented certain new and useful Improvements in Cement for Eyeglass-Mountings, of which the following is a specification.

This invention relates to a composition of matter for use in cementing the box like clips of eyeglass mountings to the lenses of eyeglasses. And the present improvement has for its object to provide a simple and efficient composition of matter adapted to be manipulated under the influence of an elevated temperature, to firmly bond the metal clips to the lenses of eyeglasses, and with which the removal of any excess of the composition can be effected without scratching or marring of the surface of the lenses, all as will hereinafter more fully appear.

The present composition or cement, comprises a combination of a pulverulent resinous gum capable of fusion by heat, such as commercial gum shellac, a finely powdered metal formed by grinding to a powder very thin sheets of metal or metal alloys, and a fine earthy body, such as commercial talc, mixed in suitable proportions, preferably as follows: Powdered gum shellac, fifteen parts, by weight; bronze leaf powder, eight parts, by weight; talc, ten parts, by weight.

The above mentioned finely powdered metal is generally known and has an extensive sale in the market, under trade terms such as "French leaf bronze powder" and like descriptive names indicative of the derivation of the powders.

The different ingredients are thoroughly mixed by any usual means, and when required for use, the desired amount of the mixture is placed between the inner surfaces of the box clip and the edge of the lens of an eyeglass after which heat is applied to effect a fusion of the mixture and attain an adhesion of the same to the immediately adjoining surfaces of the clip and lens.

From extended practical experiment with the present cement composition, it has been found that a very effective adhesion between the cement and the metallic surface of the clip, and the vitreous substance of the lens is attained. The strength of such adhesion being such that under destruction tests, the glass of the lens immediately adjacent to the box clip will pull apart before such adhesion is overcome.

Having thus fully described my said invention what I claim as new and desire to secure by Letters Patent, is:—

1. The herein described composition for cementing box-clips to eyeglass lenses, consisting of approximately fifteen parts fusible gum, eight parts finely powdered metal, and ten parts finely divided earthy matter.

2. The herein described composition for cementing box-clips to eyeglass lenses, consisting of approximately fifteen parts gum shellac, eight parts leaf bronze powder, and ten parts finely divided earthy matter.

3. The herein described composition for cementing box-clips to eyeglass lenses, consisting of approximately fifteen parts fusible gum, eight parts finely powdered metal, and ten parts finely divided talc.

4. The herein described composition for cementing box-clips to eyeglass lenses, consisting of approximately fifteen parts gum shellac, eight parts leaf bronze powder, and ten parts finely divided talc.

5. The method of cementing box-clips to eyeglass lenses which consists in taking a composition consisting of approximately fifteen parts fusible gum, eight parts finely powdered metal and ten parts finely divided earthy matter, thoroughly mixing the ingredients of the composition together, placing the desired amount of the composition between the inner surface of the box-clip and the edge of the eyeglass and finally applying heat to effect a fusion of the composition and attain an adhesion of the same to the immediately adjoining surfaces of the clip and the lens.

Signed at Chicago, Illinois, this 28 day of April, 1914.

WILLIAM R. UHLEMANN.

Witnesses:
ROBERT BURNS,
HYDE W. PERCE.